Feb. 13, 1962     B. E. HITE     3,020,681
TOOL FINISHING PROCESS AND APPARATUS
Filed March 14, 1957     4 Sheets-Sheet 1

*INVENTOR.*
BERNARD E. HITE
BY
Oberlin & Limbach
ATTORNEYS

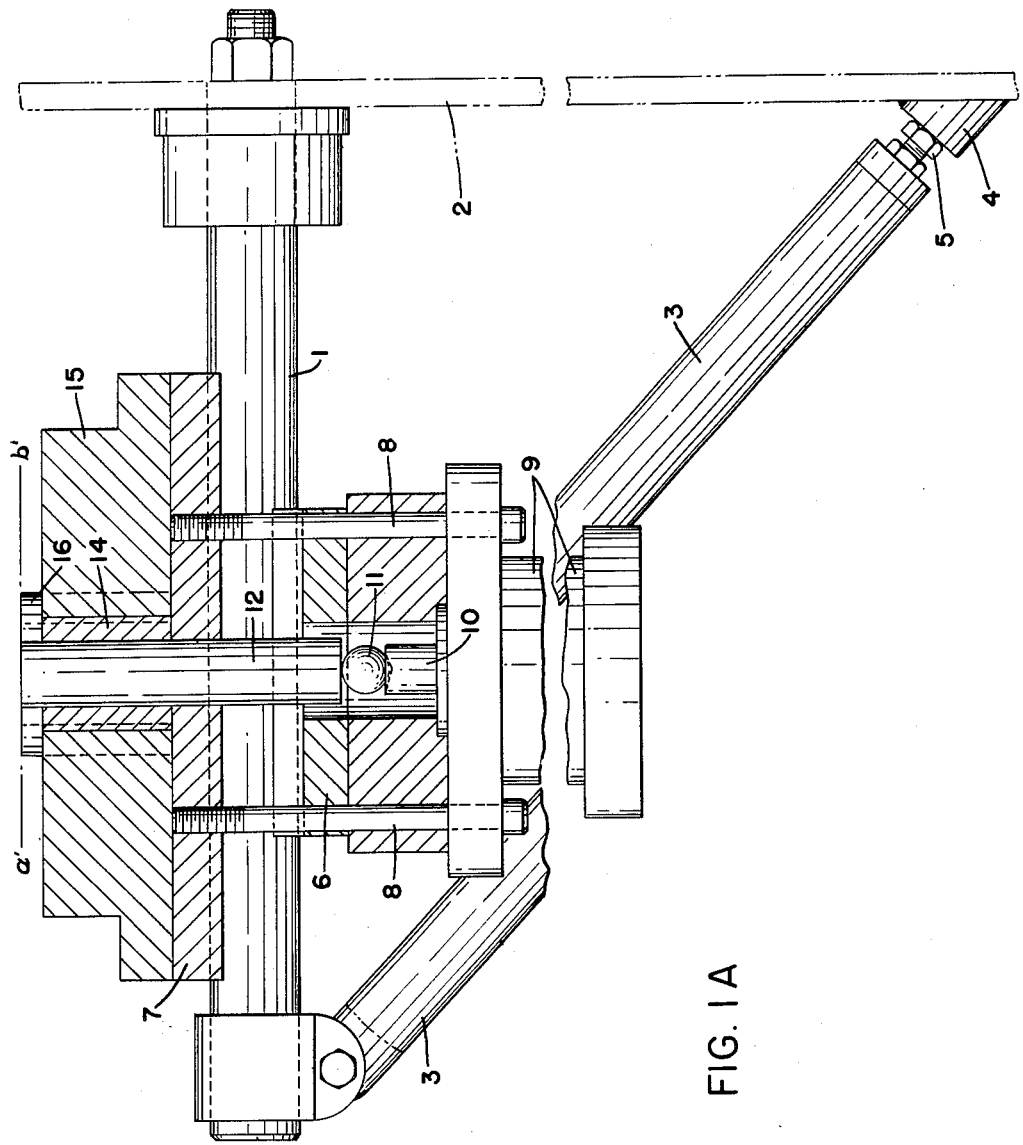
FIG. IA
INVENTOR.
BERNARD E. HITE
BY
Oberlin & Limbach
ATTORNEYS

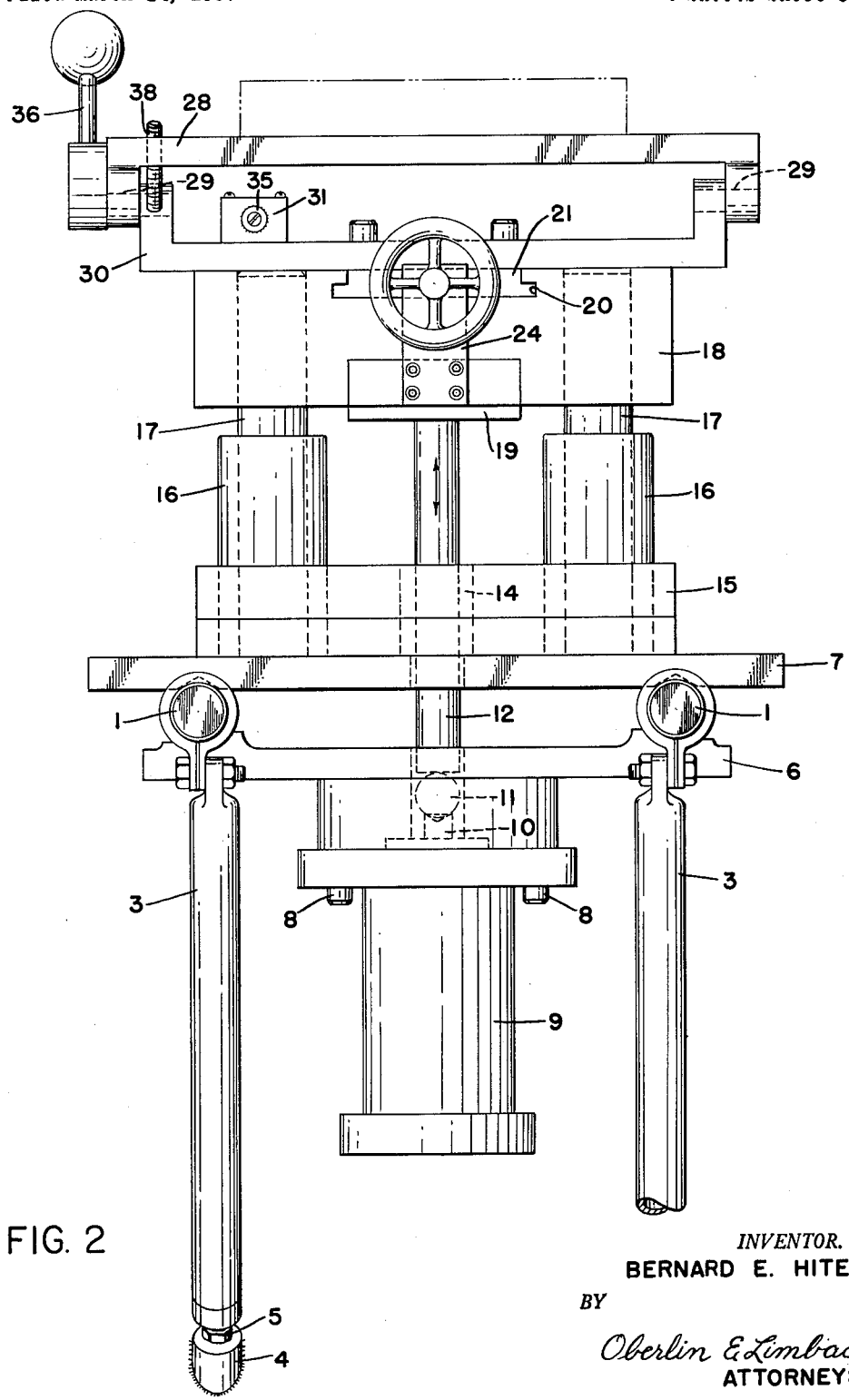

Feb. 13, 1962   B. E. HITE   3,020,681
TOOL FINISHING PROCESS AND APPARATUS
Filed March 14, 1957   4 Sheets-Sheet 4
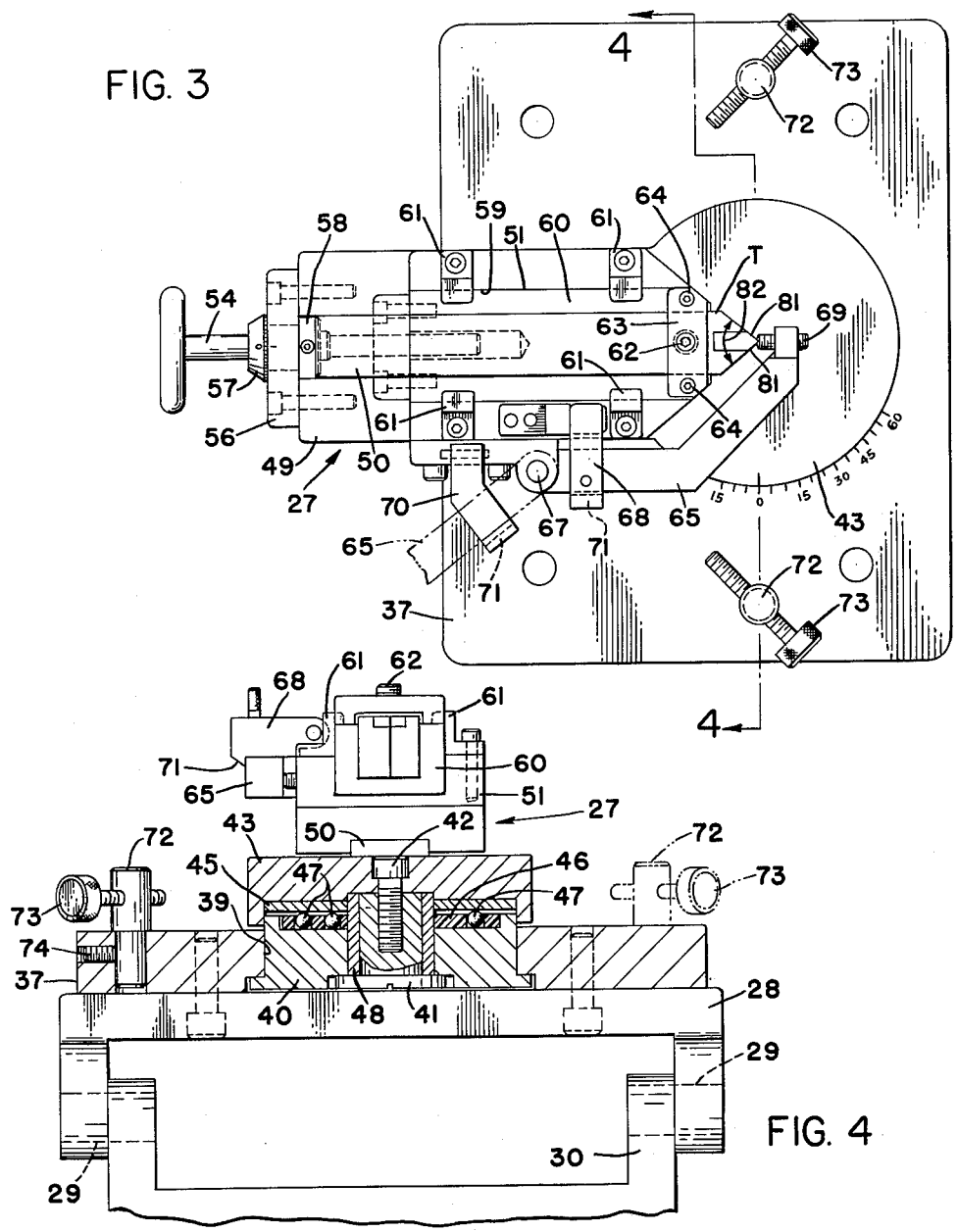
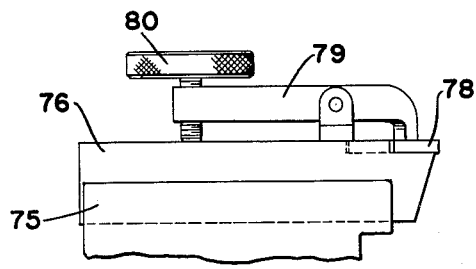
INVENTOR.
BERNARD E. HITE
BY
Oberlin & Limbach
ATTORNEYS

United States Patent Office 3,020,681
Patented Feb. 13, 1962

3,020,681
TOOL FINISHING PROCESS AND APPARATUS
Bernard E. Hite, Norwalk, Ohio, assignor to Carbide Grinders, Inc., Norwalk, Ohio, a corporation of Ohio
Filed Mar. 14, 1957, Ser. No. 646,073
5 Claims. (Cl. 51—122)

This invention relates generally as indicated to a tool finishing process and apparatus and more especially to a process and apparatus for finish grinding of so-called "single point cutters" for lathes, planers, shapers, turret lathes, boring mills and the like.

As is well-known in the art, single point cutters are usually made of carbon tool steel, high speed steel, Stellite, cemented carbides, and diamonds. In addition, there is a trend at the present time to employ ceramic cutters for certain specialized uses such as, for example, for cutting phenolic and like organic plastic materials.

In the making of cutters, for example, carbide cutters, one recommended technique is to employ, for rough grinding, a soft-bonded silicon carbide peripheral wheel of 62 to 80 grit and, for finish grinding, a soft-bonded silicon carbide cup or face finishing wheel of 100 to 120 grit. The best and prevalent practice in the grinding of carbide tools is to first rough grind to angles several degrees (2°–5°) greater than the desired finished grind angles so as to materially reduce the amount of finish grinding required on the carbide tips. In grinding carbide cutters the grinding may be done dry or wet and, in either event, the cutter should be moved back and forth with respect to the wheel to prevent gouging of the latter.

Another rigidly adhered to rule in the grinding of cutters whether of tool steel, high speed steel, Stellite, carbides, etc., is to rotate the wheel in a direction such that its movement is away from the cutting edge, and in this respect it has been recommended that the top rake be ground first and then the clearance.

I have found in departing from these known and conventional practices and apparatuses that the life of the cutting edges of a tool may be substantially increased, a main contributing factor being the elimination of the minute teeth or serrations which are formed along the cutting edge of the tool when the wheel surface moves in a direction away from the cutting edge. Such serrations, hardly visible to the naked eye, result in inefficient heat transfer from the cutting edge and in breakdown of the teeth causing dulling of the cutting edge.

Another drawback with existing practices and apparatuses is that nose radii formed on the cutting edges are not tangent to the adjacent cutting edge portion whereby points of high unit stress are created, with consequent breaking-out of pieces of the tool at such tangent breakout points.

Aside from the foregoing, it has been found imperative, or at least highly desirable, to use diamond grinding wheels when grinding for example, carbide cutters, such diamond wheels being so expensive as not to make it feasible to keep stocks thereof on hand for ready use.

With the foregoing in mind it is a principal object of this invention to provide a tool finishing process which produces tools having cutting edges which last at least 40% longer than the cutting edges formed by known processes.

It is another object of this invention to provide a novel form of apparatus for so grinding cutters for increased life, and without requiring diamond wheels, even on carbide cutters.

It is another object of this invention to provide an apparatus by which nose radii formed on cutting edges are precisely tangent to adjacent cuting edge portions thereby eliminating premature dulling or cutting edge breakdown which otherwise occurs at tangent breakout points.

It is another object of this invention to provide a tool finishing process in which the finish grinding operation is like a lapping operation and is characterized in that the face of the wheel is moved in a direction generally parallel to, or longitudinally along, the cutting edges whereby to eliminate the minute teeth or serrations aforesaid.

Still another object is the provision of apparatus by which side cutting edge, end cutting edge, nose, and clearance (or relief) angles are accurately formed on the cutter and are readily duplicated when finish grinding or sharpening a plurality of identical cutters.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 and FIG. 1A constitute a side elevation view of a preferred form of apparatus for practicing the present invention, the lower portion of said apparatus as shown in FIG. 1A being in cross-section;

FIG. 2 is an elevation view of the lower portion of the apparatus of FIG. 1, as viewed from the left-hand side of FIG. 1;

FIG. 3 is a top plan view of the grinding fixture mounted on said lower portion as viewed from the top of FIG. 1;

FIG. 4 is a cross-section view taken substantially along the line 4—4, FIG. 3; and FIG. 5 is a side elevation view of a modified form of tool clamp that is adapted to be employed with a cutter having a throw-away tip.

Figure 1:
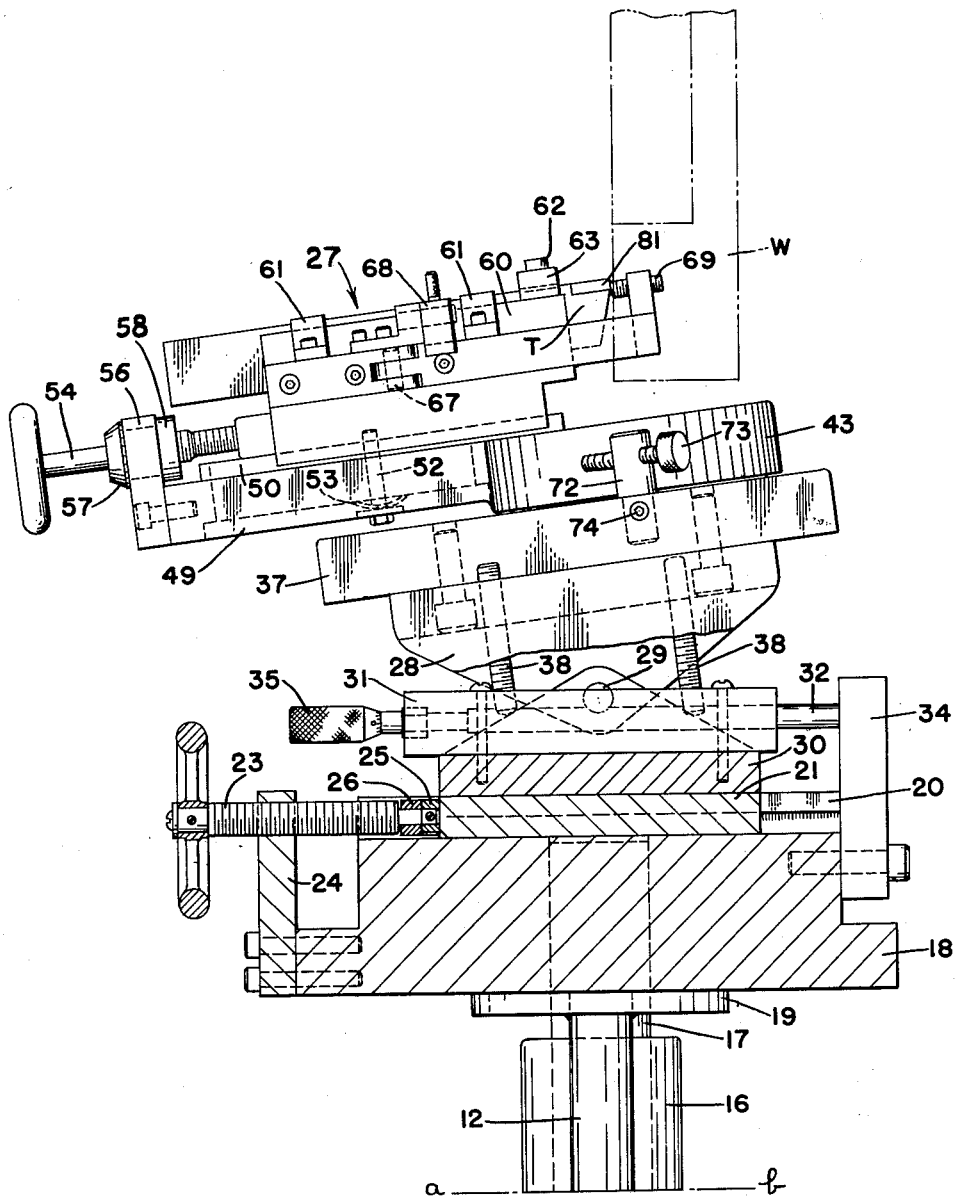

Referring now more particularly to the drawings, and first especially to FIGS. 1 and 2, the lower portion of the present apparatus is supported on a pair of parallel, horizontally extending bars 1·1 each of which is anchored to a fixed support 2 and provided with a diagonal brace 3 extending between the outer end of the respective bars 1 and a bracket 4 on said fixed support 2. Each diagonal brace 3 is provided with an adjusting screw 5 so that said parallel bars 1·1 may be leveled.

Extending transversely across and under said bars 1·1 is a clamp plate 6 formed with arcuate recesses embracing the respective bars. Also extending transversely across and above said bars 1·1 is a mounting plate 7 which is formed with V-notches fitted over the upper surfaces of the respective bars. Said plates 6 and 7 are drawn together as by means of screws 8, which also serve to support the hydraulic cylinder 9 in depending relation to said bars and therebetween.

Said hydraulic cylinder 9 has a piston (not shown) vertically reciprocable therein, the piston rod 10 of which is formed with a conical recess in its upper end surface which engages a ball 11 and in turn the ball engages the bottom plane end of a pusher rod 12, said pusher rod being vertically slide-guided in a bronze bushing 14 carried by the lower member 15 of a die set. Thus, misalignment of piston 10 and rod 12 is of no consequence.

Said member 15 is provided with upstanding bosses 16 provided with ball-bearings in which the downwardly extending pins 17 are vertically slidable. In turn, the upper ends of said pins 17 are press fitted in the top member 18 of said die set.

The upper end of the pusher rod 12 has welded or otherwise secured thereto, a flange 19 that is formed with an upper plane surface that engages the lower plane surface of the top member 18 of said die set.

As is now apparent when the piston rod 10 moves upwardly, the pusher rod 12 will move upwardly therewith through force exerted by the ball 11 and the upward movement of said pusher rod 12 will, through the abutting plane surfaces of the flange 19 and member 18, move the latter upwardly, such movement being accurately guided by the pins 17 which are slidably fitted in bearings contained in the bosses 16. When piston rod 10 moves down the pusher rod 12 and member 18 will move down.

The top member 18 of said die set is formed with a slideway 20 which is transverse to the face of the grinding wheel W. Movable in such slideway 20 is the cross-slide plate 21 that is moved along said groove by the fixture compensating screw 23, the latter having threaded engagement with the screw mount 24 bolted onto said top member 18. Said screw 23 is provided with a collar 25 thereon disposed between cross-slide plate 21 and a block 26 affixed to the latter. Accordingly, the grinding fixture 27, presently to be described, may be moved toward or away from the wheel W by said screw 23.

The grinding fixture 27 is mounted on a two-part support table of which the upper part 28 is hinged by pins 29 to the lower part 30, the latter being bolted to the cross-slide plate 21. A micrometer mount block 31 is secured on lower part 30 and is provided with an extension rod 32 adapted to engage the micrometer stop block 34. The micrometer compensator for wheel dressing, is indicated by the reference numeral 35.

The upper part 28 of the grinding fixture support table is provided with down-turned lugs as shown embracing the up-turned lugs of the lower part 30 with pivot pins 29 extending therethrough. One of said pins 29 is provided with an actuating lever 36 as shown.

Referring now in detail to the grinding fixture 27 there is mounted on the upper part 28 of said fixture support table the base 37 of the fixture which is adapted to be adjustably tilted with respect to the face of the grinding wheel W to provide the desired clearance (or relief) angle on the point of the tool that is to be finished ground on the equipment. Lock screws 38 are provided as shown in FIG. 1 for locking the base 37 at the desired angle.

As best shown in FIG. 4, the base 37 is formed with a large counterbored opening 39 through which a flanged bottom bearing plate 40 extends upwardly and to which is secured, as by means of the arbor 41 and screw 42, the radius arm 43, there being interposed between said bearing plate 40 and arm 43 another bearing plate 45 which engages the ball bearing assembly disposed in a recess formed in the upper surface of the first-mentioned bearing plate 40. The ball separator 46 preferably comprises a ring of plastic material such as "Lucite" which is formed with a plurality of random spaced holes therethrough, herein 25 in number, in which the respective balls 47 are held. Fitted between the arbor 41 and the arm 43 and bottom bearing plate 40 is a bushing 48. The ball bearing assembly aforesaid is preloaded axial to .002 to .003" by the tightening of the screw 42 so as to avoid any wobbling or looseness of arm 43, while yet permitting free swing of said arm 43.

The radius arm 43 is formed with a radially extending portion 49 formed with a radially extending slideway 50 on which the tool mount 51 for holding a tool T to be finish ground is mounted.

Said tool mount 51 is yieldably held down against slideway 50 as by the screw 52 provided with a spring washer 53.

Radial adjustment of said tool mount 51 is effected as by means of the micrometer screw 54 which is held against axial movement relative to the screw holder 56 by graduated flange 57 thereof and collar 58 thereon, and which screw has threaded engagement in the end of said tool mount 51.

The tool mount 51 is provided with a radially extending groove 59 adapted to embrace the sides and bottom of an adapter 60, the adapter being held in place by four clamps 61 located as best shown in FIG. 3. The tool T itself is mounted in the adapter 60 and is held in place by the screw 62 that is threaded into the clamp 63, the latter in turn being secured by screws 64 across the top and front end of the adapter.

The tool mount 51 further carries a swingable tool stop 65 for swinging on the pin 67 from the solid line position of FIG. 3 to the dot-dash line position. Said tool stop 65 is releasably held in place by the swingable tool stop lock 68 and the end of said tool stop is provided with an adjustable screw 69 against which the tool T to be ground is adapted to be positioned. Another tool stop lock 70 serves to releasably hold said tool stop 65 in its out-of-the-way position, both locks 68 and 70 being formed with beveled surfaces 71 for self-latching.

Having made that adjustment, that is, positioning the tool nose at the axis of the ball bearing assembly the tool stop 65 is swung out of the way. Then the angle stops may be adjusted to determine the nose angle and side and end cutting angles of the tool T, said angle stops each comprising an upstanding pin 72 that is rotatably adjustable in a vertical bore of the base 37 and each being formed with a transverse threaded bore to receive the adjusting screw 73. Locking in adjusted position is effected by set screws 74.

The base 37 is graduated in degrees as shown, whereupon the radius arm 43 and tool mount 51, is rotated first to one side and then to the other, the angle stops 72 being turned and the adjusting screws 73 likewise turned so that the ends of the latter squarely abut the sides of the radius arm 43.

For accurate finishing of the nose radius on tool T, all that is necessary to do is to turn micrometer screw 54 so that the graduations on flange 57 show the desired amount of stock removal.

In FIG. 5 there is shown a different form of tool mount 75 in which the adapter 76 is formed with a notched front end for receiving the throwaway tip 78, said tip being held in place by the pivoted clamp bar 79, the front end of which is forced downwardly by the fulcrum screw 80.

Having made the various adjustments for clearance angle (by screws 38), for nose angle (by angle stops 72—73) and for nose radius (by screw 23) all as previously explained, the operator need only to insert one tool T after another and each time merely swing the radius arm 43 and tool mount 51 thereon between the angle stops 72—73 whereby the side and end cutting edges 81 or nose angle 82 are sharpened by movement of the wheel face in a direction substantially parallel or longitudinally of the cutting edges. By reason of the rotary mounting on pre-loaded bearing 46 of the radius arm 43, the nose radius will be accurately ground and there will be no tangent breakout points whatever since such radius is precisely tangent to the cutting edges 81.

In making the preliminary adjustments of the apparatus herein the micrometer compensator 35 may be set to zero and screw 23 turned to bring the end of rod 32 into abutment with stop block 34. The entire die set 18—15 and plates 6—7 may be adjusted on bars 1 to position the vertical plane passing through the axes of pusher rod 12 and pins 17 a desired distance away from the face of wheel W.

Then with screw 69 located as aforesaid, the tool T is positioned thereagainst, whereupon turning in of screw 23 determines the nose radius which will be ground on the tool T. Subsequent adjustments for wheel dressing will not change the nose radius thus established by screw 23.

By way of specific example, the tool T will first be rough ground on a roughing spindle using for example, a 38 to 80 grit wheel, the speed of which is from about 5000 to about 6500 feet per minute. This grinding is done to the standard clearance and rake angles. In such rough grinding and as aforesaid, the clearance may be from about 2 to 5° greater than the desired clearance.

Now for the finish grinding, the tool T is mounted in the present apparatus and the wheel speed is again the same as before, viz: from about 5000 to 6500 feet per minute and the grit thereof is from about 60 to 150 or may even be as fine as 220 and even up to 600 grit, the wheel W being a soft-bonded silicon carbide wheel for carbide tipped tools.

For a pulley grooving tool T, as herein shown, it has been found that an 80 grit finishing wheel enables fast cutting of the pulley and produces a fine finish groove between about 5 and 10 microns. By reason of the relative positioning of the tool T with respect to the wheel rotation the finishing operation herein removes all of the vertical lines in the finish zone which preferably will only be for a short distance below the cutting edges 81 viz. from about $\frac{1}{32}$ to $\frac{1}{8}$", as desired. Such finish grinding removes the serrations or teeth which otherwise are present when conventional practices are followed. Such elimination of serrations or teeth results in an increased cutting edge life of from about 25 to 40% and more, and, in some instances, as much as 200% increased life.

In the present case it has been found that a 48 grit silicon carbide wheel produces a finish on the cutting edges 81 and nose equivalent in quality to that produced by a 220 grit diamond wheel when the diamond wheel is used in the conventional manner. For instance, a ¾" square shank tool T with a 13/32 radius is ground with the present apparatus in five minutes, whereas ordinary procedures take one-half hour. Furthermore, there is ease of duplication and good results have been obtained in finish grinding or sharpening of ceramic tools. The vertical stroke frequency of the hydraulic cylinder 9 for wheel dressing may be varied for example, between 1 and 30 strokes per minute, the length of the stroke being sufficient to traverse the entire annular face of the wheel W. In normal practice 2–4 strokes per minute is adequate to keep the wheel W properly dressed.

Referring again to the conventional finishing practice in which the wheel movement is downward away from the cutting edges of the cutter, minute serrations are inevitably formed and in the absence of accurate guiding of the cutter to form nose radii as herein there are tangent breakout points. It is believed that, at least to some degree, the early failure of carbide tip cutters when ground in this manner is due to cobalt breakdown which causes flaking of the tungsten.

The present invention is a basic and radical departure from the conventional. Experienced grinders and tool engineers, with many years of experience, all recommend the following basic rule for finish grinding of single point tools:

Constantly move the tool during the grinding operation with the wheel running down into the cutting edge, never crosswise or away from the cutting edge.

As apparent from the foregoing, the present procedure violates this firm rule, but, in so doing, basically new and unexpected results are achieved. Among such results are greatly increased cutting edge life thereby effecting substantial savings in frequency of re-sharpening and correspondingly extending tool life, smoother finish of the work despite the use of a coarser grit wheel in the present case thereby effecting further savings in wheel cost and finish grinding (or re-sharpening) time, and elimination of tangent breakout points not only prevents breakdown of the cutting edges but produces better quality work.

Other modes of applying the principle of the invention may be employed, change being made as regards the details described, provided the features stated in any of the following claims, or the equivalent of such, be employed.

I therefore particularly point out and distinctly claim as my invention:

1. Apparatus for finishing single point cutting tools and the like comprising means having a moving abrasive surface, a tool mount adapted to mount a tool thereon with its cutting end disposed against such surface, and means supporting said mount in a position such that the abrasive surface moves in a direction generally parallel to the cutting edge of the tool, said tool mount comprising a base part and a tool holding part that are rotatably connected by anti-friction means for rotation of the latter about an axis inclined and extending from a point disposed behind such abrasive surface at said base part to a point in front of such abrasive surface to form a radius on such cutting edge that is tangent to the adjacent cutting edge portions, and means readily to position such axis toward and away from such abrasive surface to adjust the radius formed on such cutting tool.

2. The apparatus of claim 1 wherein means are provided for adjustably tilting said mount to form a cutting edge on the tool that has a specified clearance.

3. The apparatus of claim 1 wherein means are provided for reciprocating said tool mount along a vertical line that is parallel to such abrasive face whereby such face is dressed by contact with the tool.

4. Apparatus for finishing single point cutting tools and the like comprising a moving abrasive surface, a tool mount adapted to mount a tool thereon with its cutting end disposed against such surface such that the abrasive surface moves in a direction generally parallel to the cutting edge of such tool, said tool mount comprising a base part and a tool holding part, axially preloaded anti-friction means rotatably connecting said base part and said tool holding part about an axis inclined and extending from a point disposed behind such abrasive surface at said base part to a point in front of such abrasive surface to form a radius on such cutting edge that is tangent to adjacent cutting edge portions, means for adjusting said tool mount to move such axis toward and away from such abrasive surface whereby to change the radius of such cutting edge, adjustable stop means controlling the limit of rotation of said tool holding part with respect to said base part thereby controlling the nose angle formed on such tool, adjusting screw means for tilting said mount to form a cutting edge on such tool with a specified clearance, and means for reciprocating said tool mount vertically along a line that is parallel to such abrasive face whereby such face is dressed by contact with such tool.

5. A tool finishing process for enhancing the life of carbide-tipped and like cutters and for producing cutting edges of fine finishing characteristics on work comprising the steps of providing a rotating soft bonded silicon carbide grinding wheel of from about 60 to about 150 grit, rotating such wheel at a speed such that an abrasive surface thereof has a speed of from about 5,000 to 6,500 feet per minute, placing the cutting end of a tool against such surface of the wheel and in a position such that the cutting edge is generally parallel to the direction of movement of such surface where contacted by the tool, swinging such tool about a fixed inclined axis extending from behind such surface to a point in front of such surface to form a radius on the cutting edge that is tangent to adjacent cutting edge portions, and limiting such swinging movement to provide a predetermined nose angle for such tool.

References Cited in the file of this patent
UNITED STATES PATENTS

| | | |
|---|---|---|
| 1,625,049 | Oliver | Apr. 19, 1927 |
| 2,454,472 | Monkley | Nov. 23, 1948 |
| 2,475,796 | Mader | July 12, 1949 |
| 2,502,922 | Bura | Apr. 4, 1950 |
| 2,574,586 | Oliver | Nov. 13, 1951 |
| 2,600,432 | Sanders | June 17, 1952 |